United States Patent
Hewertson et al.

(10) Patent No.: US 11,598,522 B2
(45) Date of Patent: Mar. 7, 2023

(54) MULTI-BURNER ROTARY FURNACE MELTING SYSTEM AND METHOD

(71) Applicant: Air Products and Chemicals, Inc., Allentown, PA (US)

(72) Inventors: Russell James Hewertson, Wescosville, PA (US); Shailesh Pradeep Gangoli, Allentown, PA (US); J. Bruce Kenworthy, Franklin, TN (US); Xiaoyi He, Orefield, PA (US); Anup Vasant Sane, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 177 days.

(21) Appl. No.: 17/066,733

(22) Filed: Oct. 9, 2020

(65) Prior Publication Data
US 2021/0116125 A1   Apr. 22, 2021

Related U.S. Application Data

(60) Provisional application No. 62/923,848, filed on Oct. 21, 2019.

(51) Int. Cl.
*F23C 5/08* (2006.01)
*F23D 99/00* (2010.01)
(Continued)

(52) U.S. Cl.
CPC ............ *F23D 91/02* (2015.07); *F23C 5/08* (2013.01); *F23C 6/045* (2013.01); *F23D 23/00* (2013.01);
(Continued)

(58) Field of Classification Search
CPC .... F23D 23/00; F27B 7/34; F27B 7/42; F23C 5/08; F23C 5/28; F27D 19/00; C22B 21/0092; C22B 21/0084; F23N 1/00
(Continued)

(56) References Cited

U.S. PATENT DOCUMENTS 3,060,014 A * 10/1962 Aihara ................. C21C 5/04
75/544
3,954,382 A * 5/1976 Hirose ................. F23C 7/02
431/9
(Continued)

FOREIGN PATENT DOCUMENTS

DE    102013017943 A1 *  4/2015   ............ F23C 5/08
EP       2843340 A1 *  3/2015   ......... C22B 21/0092
(Continued)

OTHER PUBLICATIONS

Melting Solutions Limited, Tilting Rotary Furnace—A quantum leap in melting technology; http://www.meltingsolutions.co.uk/wp-content/uploads/2010/07/Tilting-Rotary-Furnace.pdf.

*Primary Examiner* — Avinash A Savani
(74) *Attorney, Agent, or Firm* — Jason M. Ploeger

(57) ABSTRACT

A method of melting a charge in a double-pass tilt rotary furnace having a door, including operating a first burner at a first firing rate, the first burner being mounted in a lower portion of the door and producing a first flame having a length; operating a second burner at a second firing rate, the second burner being mounted in an upper portion of the door and producing a second flame having a length, the second flame being distal from the charge relative to the first flame; in an initial phase when the solids in the charge impede the first flame, controlling the second firing rate to be greater than the first firing rate; and in an later phase after melting of the solids in the charge sufficiently that the first flame is not impeded, controlling the first firing rate to be greater than the second firing rate.

10 Claims, 13 Drawing Sheets

(51) Int. Cl.
    *F23C 6/04*           (2006.01)
    *F23D 23/00*        (2006.01)
    *F27B 7/34*          (2006.01)
    *F27B 7/20*          (2006.01)

(52) U.S. Cl.
    CPC ............ *F27B 7/34* (2013.01); *F23C 2201/20* (2013.01); *F27B 7/2083* (2013.01)

(58) Field of Classification Search
    USPC .......................................................... 431/8
    See application file for complete search history.

(56) References Cited

U.S. PATENT DOCUMENTS

| | | | |
|---|---|---|---|
| 5,554,022 A * | 9/1996 | Nabors, Jr. ............. | F23L 7/007 431/351 |
| 6,068,468 A | 5/2000 | Philippe et al. | |
| 8,696,348 B2 | 4/2014 | Cao et al. | |
| 8,915,733 B2 * | 12/2014 | Cao ........................... | F27B 7/34 432/103 |
| 9,134,025 B2 | 9/2015 | Gangoli et al. | |
| 9,657,945 B2 * | 5/2017 | Gangoli ................. | F27B 9/3044 |
| 9,689,612 B2 * | 6/2017 | Gangoli .............. | F27D 21/0014 |
| 2006/0199125 A1 * | 9/2006 | Evans ....................... | F27B 7/42 431/174 |
| 2007/0287109 A1 * | 12/2007 | Lodin ..................... | F23L 7/007 431/10 |
| 2009/0004611 A1 * | 1/2009 | Kobayashi .............. | F23D 14/32 431/10 |
| 2009/0311639 A1 * | 12/2009 | Docquier ............ | F27D 99/0033 431/189 |
| 2013/0307202 A1 * | 11/2013 | Hegenberg ................ | F27B 7/10 266/87 |
| 2016/0348970 A1 * | 12/2016 | Gangoli .................. | F23N 5/242 |
| 2018/0017328 A1 * | 1/2018 | Jepson .................... | F27B 7/362 |
| 2018/0237323 A1 * | 8/2018 | D'Agostini ............. | F23D 14/56 |

FOREIGN PATENT DOCUMENTS

| | | |
|---|---|---|
| EP | 3098512 | 11/2016 |
| WO | 2009087227 | 7/2009 |

\* cited by examiner

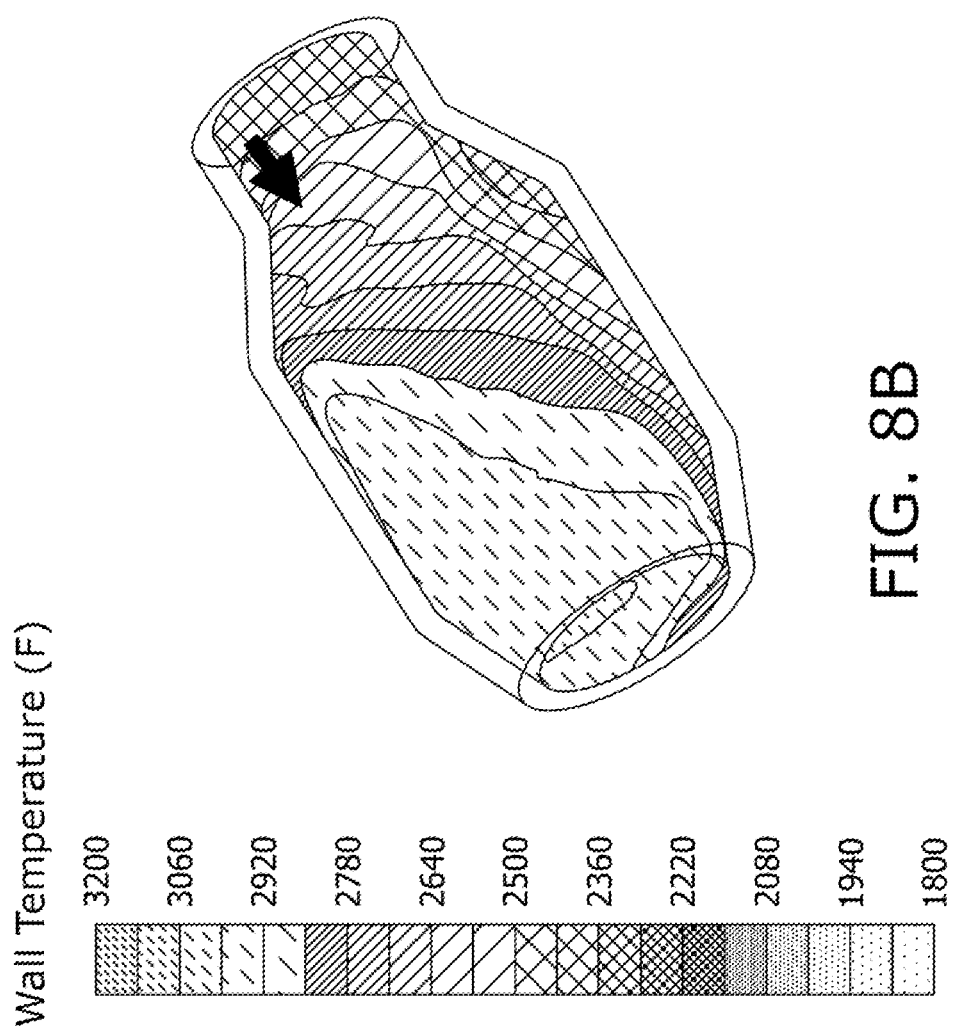

MULTI-BURNER ROTARY FURNACE MELTING SYSTEM AND METHOD

CROSS-REFERENCE TO RELATED APPLICATIONS

This application claims the priority of U.S. Provisional Application No. 62/923,848 filed Oct. 21, 2019, which is incorporated by reference herein in its entirety.

BACKGROUND

A multi-burner system and method are described herein for improving melting operations of a rotary furnace.

FIG. 1 illustrates, in a rotary furnace 100 with a single burner 10 in the door 44, how a diffusion flame 12 naturally evolves without any obstructions. The flue gases 18 circulate over the molten metal bath 14 before leaving via flue duct 16. But when the furnace 100 is charged with material to heat or melt, the combustion space may be classified into two types as illustrated in FIG. 2, a combustion space with high material porosity 20 often greater than 99% (i.e. open space), typically located in an upper portion of the furnace 100, and a combustion space with low material porosity 22 often less than or equal to 99% (i.e., space that is partially or completely blocked by charge material), typically located in a lower portion of the furnace 100.

Burners are conventionally located close to the material charged to ensure that energy is transferred preferentially to the charge (rather than to the refractory). Although direct heat transfer rate to the scrap is high, depending on the location of the flue, there is a tendency for process challenges, including: (1) incomplete mixing or combustion prior to encountering the scrap, (2) separation of fuel and oxidizer, leading to short-circuiting of flows to the flue, and (3) uneven heat distribution, which results in overheating of one side of the charge while underheating of the other side, as shown in FIGS. 3 and 4. The combination of these challenges can result in higher fuel consumption, oxidative melt losses, and reduced furnace capacity (due to buildups at the cold end). These issues also limit how hard the furnace can be fired, which quickly diminishes the returns on additional energy input via the burner. In FIG. 3, a charge 24 blocks the complete evolution of the flame 12, leading to a hotter front portion 26 of the furnace 100 and a colder back portion 28 of the furnace 100. This charge 24 may be a large chunk of scrap, or a large pile of scrap, ingots, or dross. In addition, as a result of the hotter front portion 26 and flame impingement on the charge 24, a portion of the charge 24 can overheat and be oxidized, leading to a loss of yield. FIG. 4 shows a top view of the same rotary furnace 100.

These challenges are more significant in instances when the porosity of the scrap or charge is low (i.e., large, dense charge). When the charge is light and porous, the flame can partially penetrate through it to reach the back of the furnace.

SUMMARY

Typical industrial metal melting or reheating furnaces are "batch style", wherein material is charged, melted/reheated and then tapped/drawn out of the furnace in a cyclical manner. The introduction of large-sized scrap or dross, or charging the furnace in excess of its design capacity, prevents the full development of the flame in the furnace, thus affecting the efficiency and energy distribution of the heat transfer in the furnace. This leads to issues like localized cold spots and slag build-ups, which reduce furnace capacity and productivity. The system and method described herein deal with the strategic use of multiple burners in an industrial melting or reheating furnace to improve productivity, energy efficiency and metal recovery of the process.

Aspect 1: A method of melting a charge in a double-pass tilt rotary furnace, the furnace having a chamber bounded by a generally cylindrical wall with an axis extending from a closed end to an open end, and a door configured to cover the open end, the method comprising: adding a charge containing solids into the chamber; rotating the furnace in a direction of rotation about the axis; operating a first burner at a first firing rate, the first burner being mounted in a lower portion of the door and producing a first flame having a length; operating a second burner at a second firing rate, the second burner being mounted in an upper portion of the door above the lower portion of the door and producing a second flame having a length, the second flame being distal from the charge relative to the first flame; exhausting combustion gases resulting from the first flame and the second flame through a flue positioned in the door above the charge; in an initial phase when the solids in the charge impede development of the first flame, controlling the second firing rate to be greater than the first firing rate; and in an later phase after melting of the solids in the charge sufficiently that development of the first flame is not impeded, controlling the first firing rate to be greater than the second firing rate.

Aspect 2. The method of Aspect 1, further comprising: during the initial phase, operating the first burner and the second burner such that the first flame length is less than the second flame length.

Aspect 3. The method of Aspect 2, wherein at least one of fuel and oxidizer are staged in the first burner, and the first flame length is controlled by adjusting a staging ratio of the first burner.

Aspect 4. The method of Aspect 2, wherein at least one of fuel and oxidizer are staged in the second burner, and the second flame length is controlled by adjusting a staging ratio of the second burner.

Aspect 5. The method of any one of Aspects 1 to 4, further comprising operating the second burner to produce a flame having high momentum with a velocity of at least 250 ft/s.

Aspect 6. The method of any one of Aspects 1 to 5, wherein as a result of the direction of rotation a submerging interface is formed wherein the cylindrical wall rotates into the charge and an emerging interface is formed wherein the cylindrical wall rotates out from the charge; and wherein the first burner and the second burner are positioned closer to the submerging interface than the emerging interface.

Aspect 7. The method of Aspect 6, wherein the flue is positioned closer to the emerging interface than the submerging interface.

Aspect 8. The method of any one of Aspects 1 to 7, further comprising: operating the first burner fuel-rich to produce a reducing first flame; and operating the second burner stoichiometrically.

Aspect 9. The method of any one of Aspects 1 to 8, wherein the furnace door is split such that the lower portion and upper portion can be opened independently, further comprising: when the lower portion of the door is opened for charging or pouring, continuing to operate of the second burner to maintain heat input into and positive pressure in the chamber.

Aspect 10. A multi-burner system for melting charge in a double-pass rotary furnace having chamber bounded by a generally cylindrical wall, an axis extending from a closed end to an open end, a door configured to cover the open end, and a direction of rotation, the chamber containing a charge, comprising: a first burner mounted in a lower portion of the door and positioned to direct a first flame having a length into the chamber; a second burner mounted in an upper portion of the door and positioned to direct a second flame having a length into the chamber distal from the charge relative to the first flame; a flue positioned in the upper portion of the door to exhaust from the chamber combustion gases resulting from the first flame and the second flame; and a controller programmed to operate the first burner at a first firing rate and a first stoichiometry and to operate the second burner at a second firing rate and a second stoichiometry, as a function of a phase of a melt operation in the furnace, wherein in an initial phase when the solids in the charge impede development of the first flame, the second firing rate is greater than the first firing rate, and wherein in an later phase after melting of the solids in the charge sufficiently that development of the first flame is not impeded, the first firing rate is greater than the second firing rate.

Aspect 11. The system of Aspect 10, wherein the controller is programmed to control the first flame length to be shorter than the second flame length during the initial phase of the melt operation.

Aspect 12. The system of Aspect 11, wherein at least one of fuel and oxidizer are staged in the first burner, and the first flame length is controlled by adjusting a staging ratio of the first burner.

Aspect 13. The system of Aspect 11, wherein at least one of fuel and oxidizer are staged in the second burner, and the second flame length is controlled by adjusting a staging ratio of the second burner.

Aspect 14. The system of Aspect 10, the furnace further comprising a submerging interface is formed wherein the cylindrical wall rotates into the charge and an emerging interface is formed wherein the cylindrical wall rotates out from the charge, wherein the first burner and the second burner are positioned closer to the submerging interface than the emerging interface.

Aspect 15. The system of Aspect 14, wherein the flue is positioned closer to the emerging interface than the submerging interface.

Aspect 16. The system of any one of Aspects 10 to 15, wherein the furnace door is split such that the lower portion and upper portion can be opened independently.

Aspect 17. A method of melting a charge in a single-pass furnace, the furnace having a chamber bounded by a first end wall, a second end wall, and at least one side wall joining the first end and the second end, the method comprising: adding a charge containing solids into the chamber; operating a first burner at a first firing rate, the first burner being mounted in one of the end walls and producing a first flame having a second length; operating a second burner at a second firing rate, the second burner being mounted in one of the end walls and producing a second flame having a second length; exhausting combustion gases resulting from the first flame and the second flame through a flue positioned in one of the end walls; in an initial phase when the solids in the charge impede development of at least one of the first flame and the second flame, controlling at least one of the first firing rate and the second firing rate to minimize heat loss out the flue and overheating of the furnace; and in an later phase after melting of the solids in the charge sufficiently that development of the first flame and second flame are not impeded, controlling the first firing rate and the second firing rate to maximize heat transfer to the charge.

Aspect 18. The method of Aspect 17, wherein the furnace is a rotary furnace, the first burner is mounted in the first end wall, the second burner is mounted in the first end wall, and the flue is in the second end wall.

Aspect 19. The method of Aspect 17, wherein the furnace is a rotary furnace, the first burner is mounted in the first end wall, the second burner is mounted in the second end wall, and the flue is in the second end wall.

Aspect 20. The method of Aspect 17, wherein the furnace is a reverberatory furnace and at least one of the burners is mounted in the same end wall as the flue.

Aspect 21. A multi-burner system for melting charge in a single-pass furnace having chamber bounded by a first end wall, a second end wall, and at least one side wall, the chamber containing a charge, comprising: a first burner mounted in one of the end walls and positioned to direct a first flame having a first length into the chamber; a second burner mounted in one of the walls and positioned to direct a second flame having a second length into the chamber; a flue positioned in one of the end walls to exhaust from the chamber combustion gases resulting from the first flame and the second flame; and a controller programmed to operate the first burner at a first firing rate and a first stoichiometry and to operate the second burner at a second firing rate and a second stoichiometry, as a function of a phase of a melt operation in the furnace, wherein in an initial phase when the solids in the charge impede development of the first flame, the second firing rate is greater than the first firing rate, and wherein in an later phase after melting of the solids in the charge sufficiently that development of the first flame is not impeded, the first firing rate is greater than the second firing rate.

Aspect 22. The system of Aspect 21, w wherein the furnace is a rotary furnace, the first burner is mounted in the first end wall, the second burner is mounted in the first end wall, and the flue is in the second end wall.

Aspect 23. The system of Aspect 21, wherein the furnace is a rotary furnace, the first burner is mounted in the first end wall, the second burner is mounted in the second end wall, and the flue is in the second end wall.

Aspect 24. The system of Aspect 21, wherein the furnace is a reverberatory furnace and at least one of the burners is mounted in the same end wall as the flue.

BRIEF DESCRIPTION OF THE DRAWINGS

The present invention will hereinafter be described in conjunction with the appended figures wherein like numerals denote like elements:

FIGS. 8A, 8B, and 9 are graphics showing the results of computational fluid dynamics study conducted to demonstrate the present invention. FIG. 8A is a graphic showing the temperature distribution along the walls of the furnace with single burner and multi-burner system with the bottom burner firing. FIG. 8B is a graphic showing the temperature distribution along the walls of the furnace with single burner and multi-burner system with the top burner firing.

FIG. 9 shows calculated values of heat going to the melt with single- and multi-burner system.

DETAILED DESCRIPTION

Figure 1:
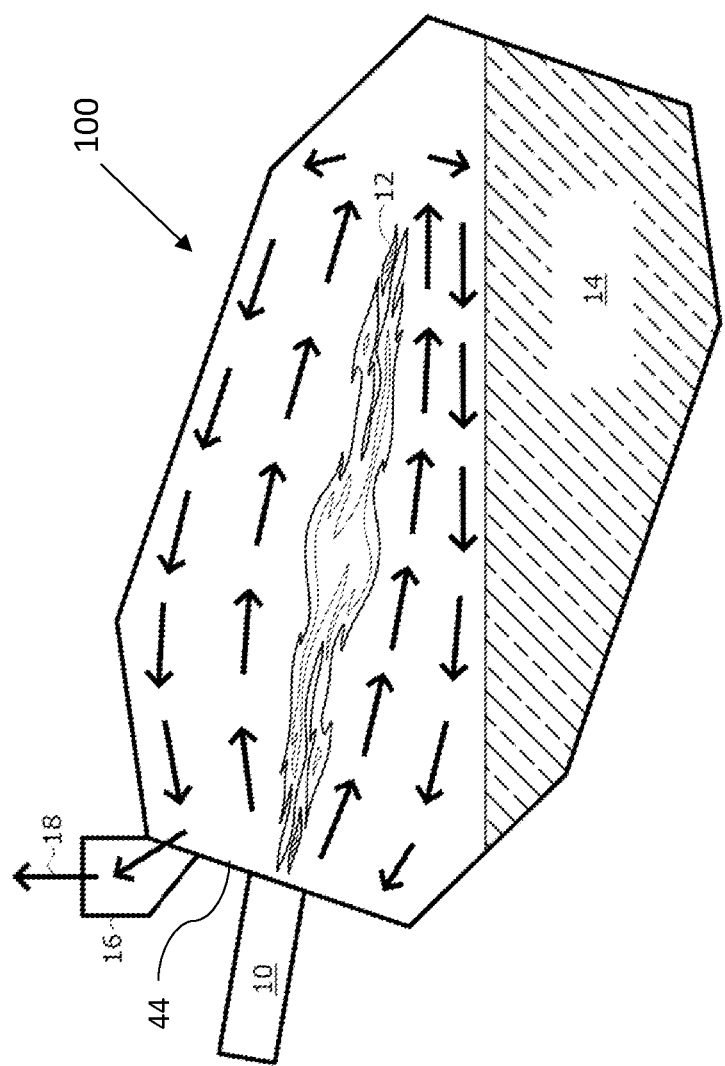
FIG. 1 is a side schematic view showing the complete evolution of an unobstructed diffusion or on-premixed flame, wherein fuel and oxidizer mix in the furnace.
Figure 2:
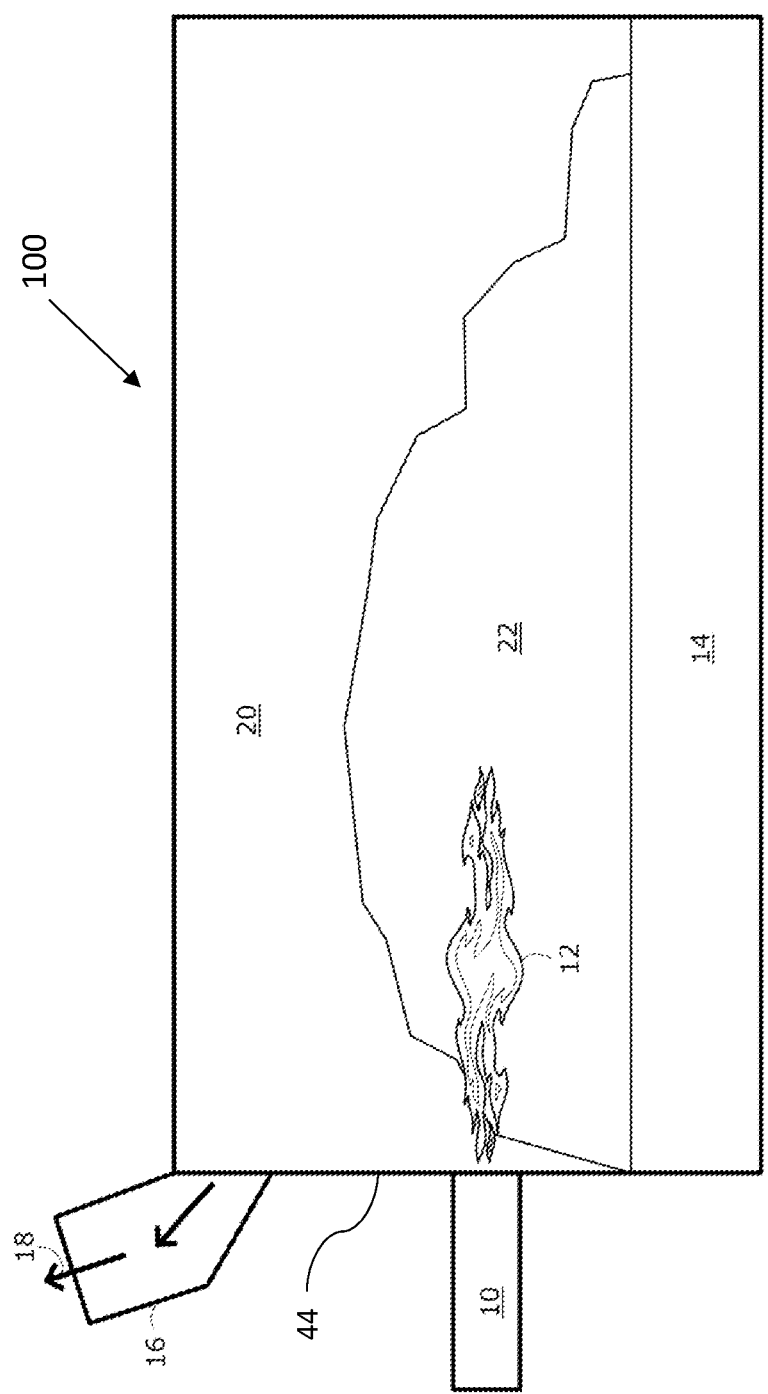
FIG. 2 is a side schematic view showing a combustion zone in a furnace that is charged with solid material to be heated and/or melted, in particular when the solid material blocks complete evolution of a flame exiting the burner.
Figure 3:
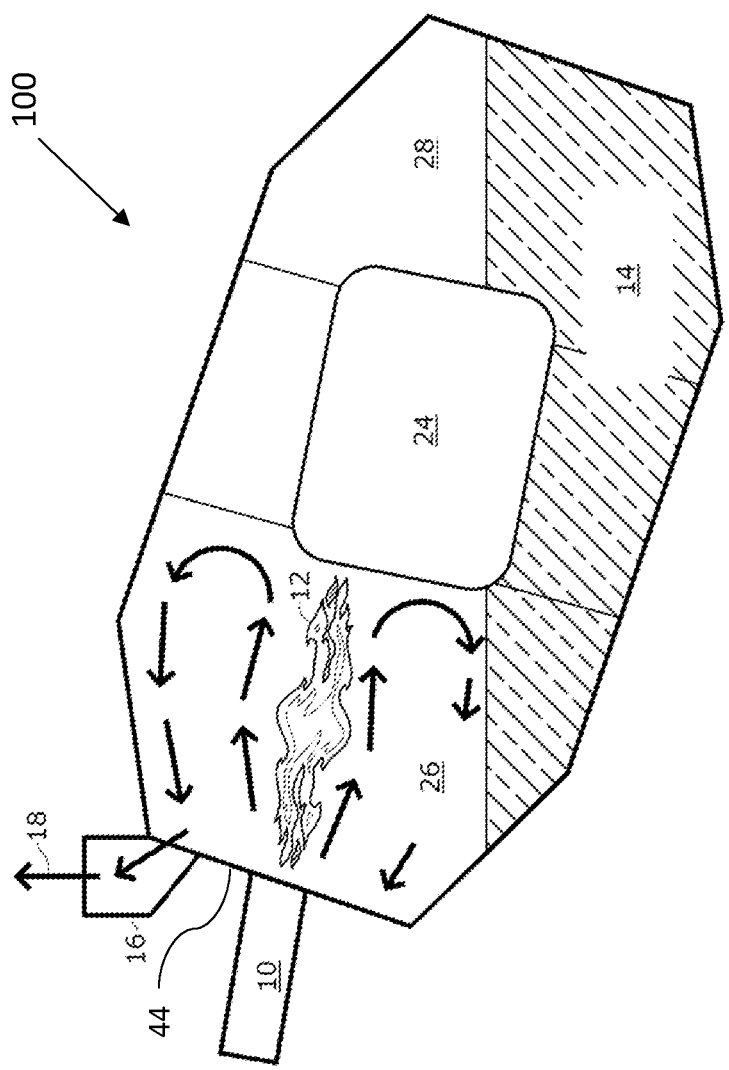
FIG. 3 is a side schematic view showing the effect of the presence of large chunks of scrap, ingots, or dross in blocking and preventing complete evolution of a flame in the furnace.
Figure 4:
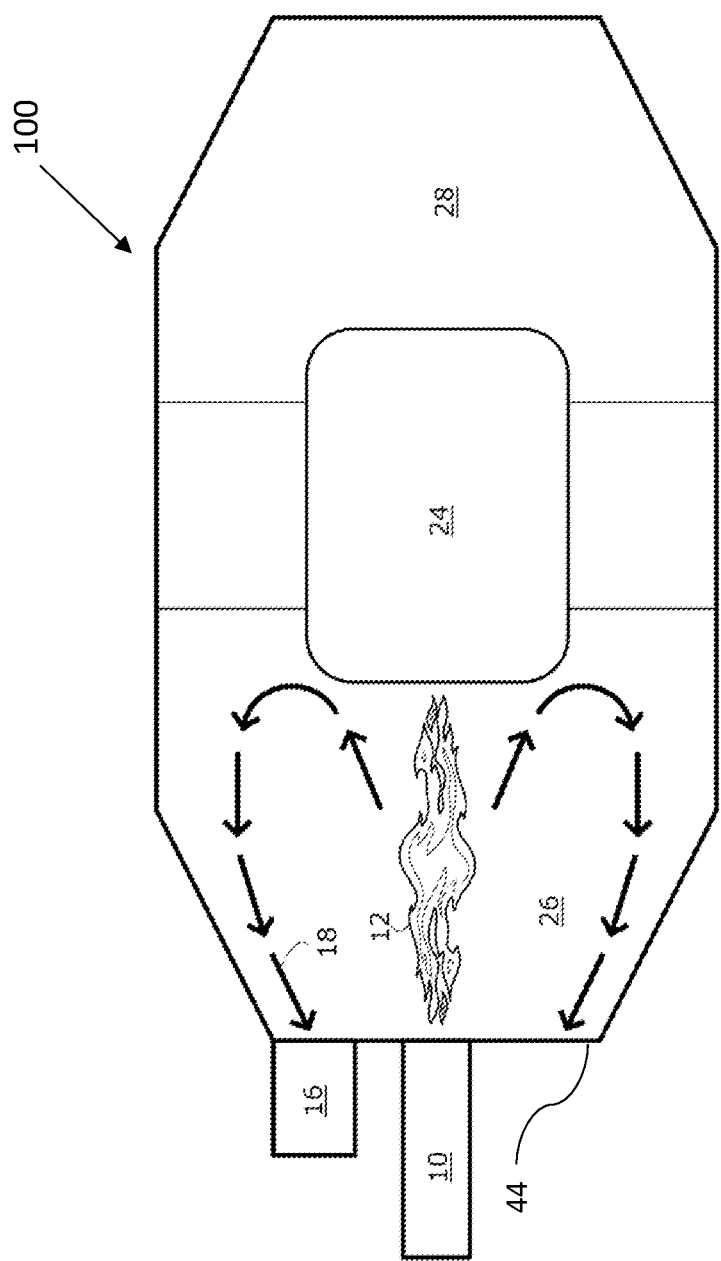
FIG. 4 is a top schematic view showing the same effect as in FIG. 3.
Figure 5:
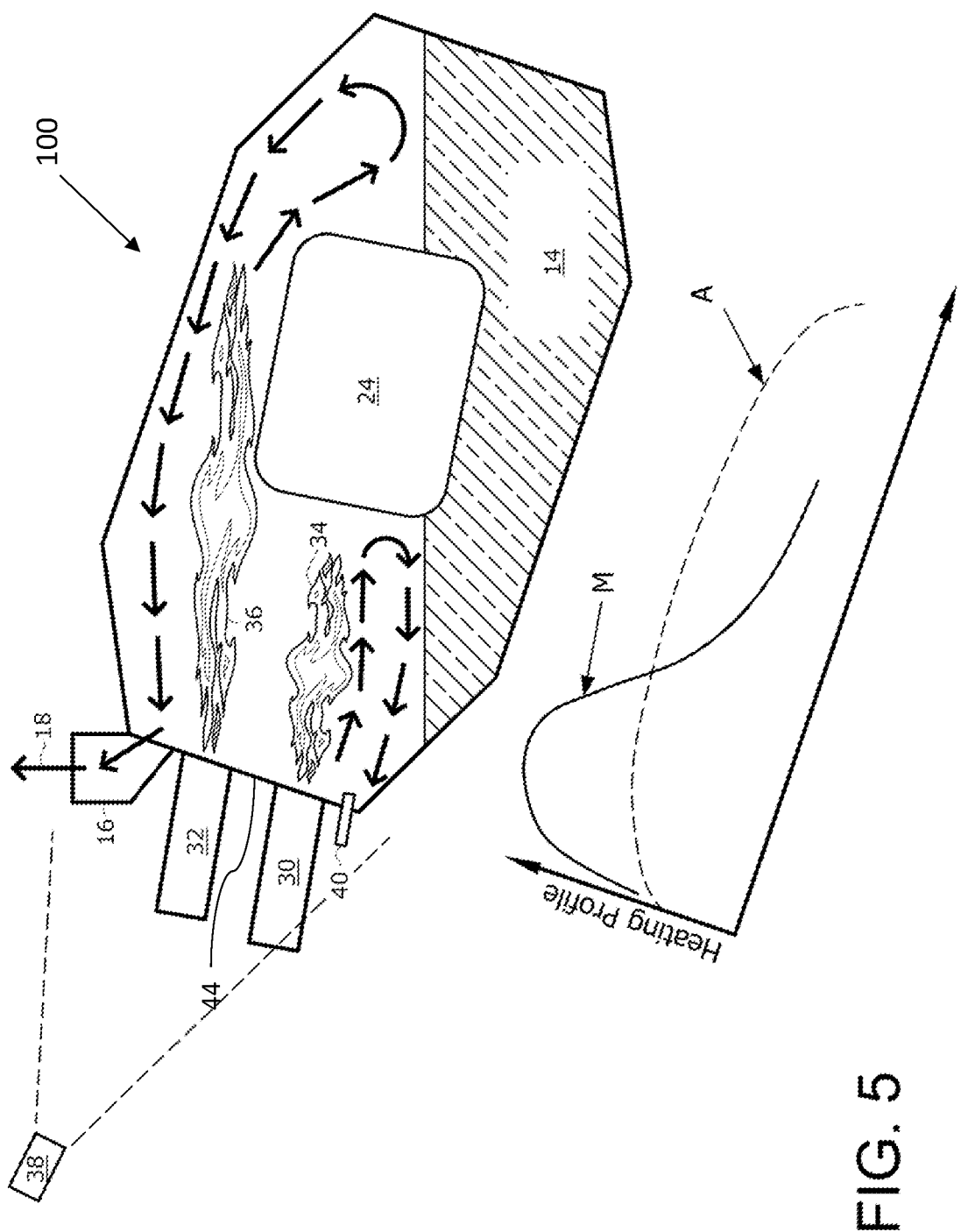
FIG. 5 is a side schematic view showing a system using two burners having different flame characteristics to allow complete evolution of flames and more uniform heat transfer even in the presence of by large chunks of scrap, ingots, or dross in the furnace.

FIG. 5 shows a multi-burner system that can be used to enhance melting in a tilt rotary furnace 100 to overcome the challenges of large dense scrap in the form of charge 24. In the illustrated embodiment, two burners are strategically located in the door 44 to enable deeper penetration of energy into the furnace, early in the melting cycle. A main burner 30 is located in the door 44 below an auxiliary burner 32. The main burner 30 produces a main burner flame 34 that impinges the charge 24, while the auxiliary burner 32 produces an auxiliary burner flame 36 that is directed above the charge 24 toward an end of the furnace 100 opposite the door 44. The main burner flame 34 has a shorter heating profile compared to the auxiliary burner flame 36, so as to optimize heat delivery from each flame to the charge 24. This can be seen in the heating profile graph in FIG. 5, in which the main burner flame heating profile is labeled M and the auxiliary burner flame heating profile is labeled A. Note that this arrangement is not limited to two burners, and that more than two burners can be strategically positioned to obtain the same effect.

As shown in the embodiment of FIG. 5, two different types of burners can be beneficially used, or one burner capable of being tuned to different heat release profiles can be used, as taught for example in U.S. Pat. No. 9,134,025.

Many factors may be adjusted to achieve optimal results with the multi-burner system described herein.

Burners should be located as far away from the flue gas duct; at least 0.5 times the diameter of the flue gas duct and preferably greater than 3 times the diameter of the flue gas duct.

At least one of the burners (for example, the auxiliary burner 32 in FIG. 5 and corresponding auxiliary burner flame 36 in FIGS. 5, 6 and 7) should be located relatively close to the roof of the furnace and somewhat above the charge, such that the flame evolves completely along the length of the furnace without obstruction from material charged in the furnace. The optimal location of this burner depends on the prevailing charging practice. This configuration is particularly applicable in a double-pass rotary furnace, where the burners and flue are located at the same (door) end of the furnace. First, in furnaces that are stationary, there will be a tendency to create localized hotspots in the furnace roof. Second, in furnaces that are single-pass in configuration, the overall flow of gases in the furnace will proceed from the burner end to the flue end, such that any obstruction by the charge will simply lead to redirection and increased residence time and eventual completion of combustion prior to leaving the furnace.

At least one other of the burners (for example, the main burner 30 in FIG. 5 and corresponding main burner flame 34 in FIGS. 5, 6 and 7), which is positioned such that evolution of its flame obstructed by the charge at a short distance, is preferably a type of burner characterized by a short flame length (i.e., combustion being complete within a short distance into the furnace). One such type of burner is described in U.S. Pat. No. 9,134,025.

Preferably, the main burner 30 is capable of staging fuel or oxidizer to modify the energy release characteristics such that the flame length is elongated and energy distribution extends further into the furnace once the charge is melted down.

Preferably, the auxiliary burner 32 produces a flame entering the furnace at a high momentum, corresponding to a velocity of greater than 250 ft/s and preferably greater than 500 ft/s at the design firing rate, to enhance the ability of the flame to penetrate the furnace.

Preferably, the auxiliary burner 32 is capable of staging fuel or oxidizer. Alternatively, or in combination, Burner 2 may be capable of flameless or spacious combustion to produce a relatively uniformly distributed heating profile to avoid overheating or hot spots on the refractory wall. One such type of burner is described in U.S. Pat. No. 8,696,348.

The main burner 30 and/or the auxiliary burner 32 may use an oxidizer with greater than 20.9% oxygen in oxidizer.

Figure 6:
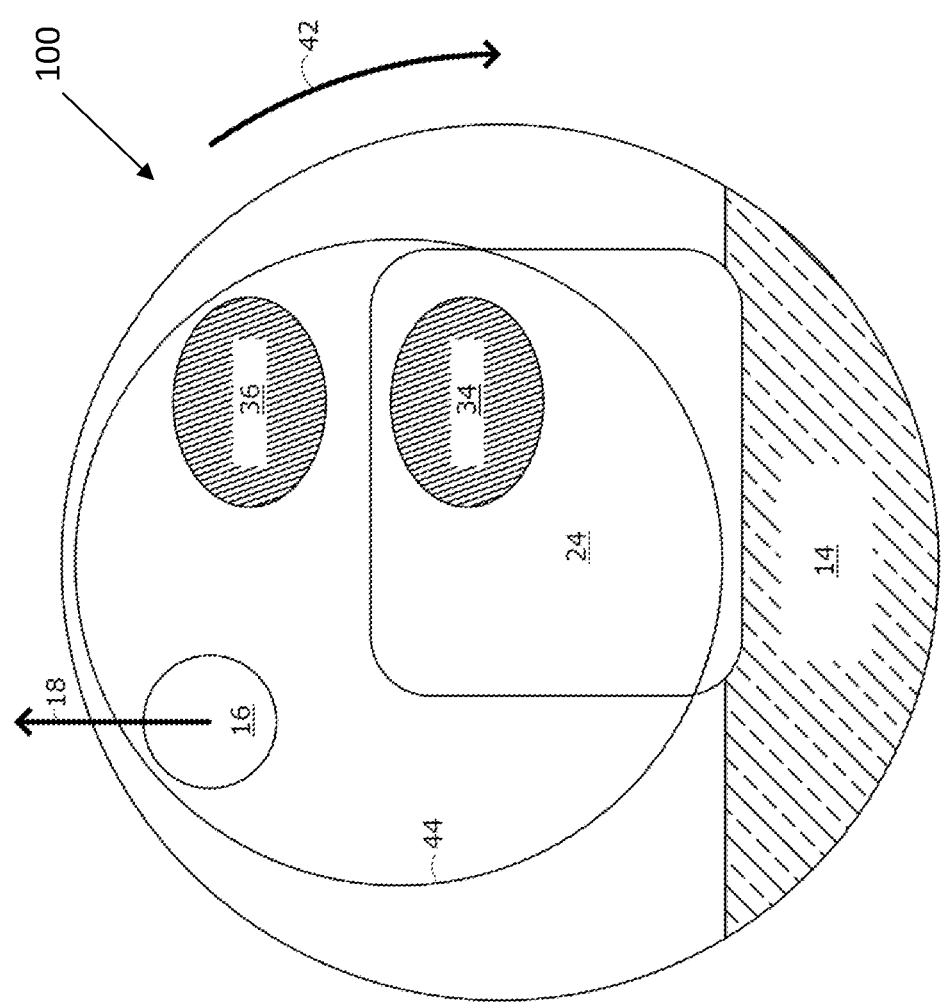
FIG. 6 is an end schematic view from the door end of the furnace showing an exemplary configuration of two burners in a multi-burner melting operation.

The main burner flame 34 and the auxiliary burner flame 36 are preferably located closer to the refractory rotating into the metal bath to heat the refractory just before it comes into contact with the charge, as indicated by rotational direction arrow 42 in FIG. 6. Additionally, the flue gas duct 16 is preferably located on the opposite (vertical) half of the furnace relative to the location of the burners, as also shown in FIG. 6.

In arrangements such as in FIGS. 5 and 6, the auxiliary burner 32 may be operated close to stoichiometric, while the main burner 30 (which produces a flame in direct contact with metal charge) is relatively fuel-rich. For example, if overall stoichiometry of operation is 1.8, and both burners have approximately the same firing rate, then the main burner 30 may be operated at 1.6 (fuel rich), while the auxiliary burner 32 may be operated at 2.0 (stoichiometric).

During an initial phase of operation, when there is a significant solid charge 24 in the furnace that may impede the development of the flame from the main burner 30, the auxiliary burner 32 is typically operated at higher firing rate than the main burner 30. In a later phase of operation, when the solid scrap 24 has largely melted into the molten bath 14, the main burner 30 may be operated at a higher firing rate than the auxiliary burner 32. This sequence of operation enables faster melting followed by faster heating of the molten charge. For example, if total firing rate is 15 MMBtu/hr, then, for the initial two-thirds of the melt cycle, the main burner 30 is operated at 5 MMBtu/hr, while the auxiliary burner 32 is operate at 10 MMBtu/hr. Then, during the final two-thirds of the melt cycle, the main burner 30 is operated at 13 MMBtu/hr, while the auxiliary burner is operated at 2 MMBtu/hr or turned off. The transition time in the melt cycle between the initial phase and the later phase depends on several factors, but most importantly on the type of scrap and the size and density of the scrap pieces. Bigger, denser scrap in charge 24 would require the auxiliary burner 32 to operate at a higher firing rate for a longer time, and smaller less-dense scrap in charge 24 would allow the main burner 30 to be ramped up sooner. Sensors, such as a UV/IR sensor 38 and/or a thermocouple 40 shown in FIG. 5, may be used to assist in decision making for this transition.

Figure 7:
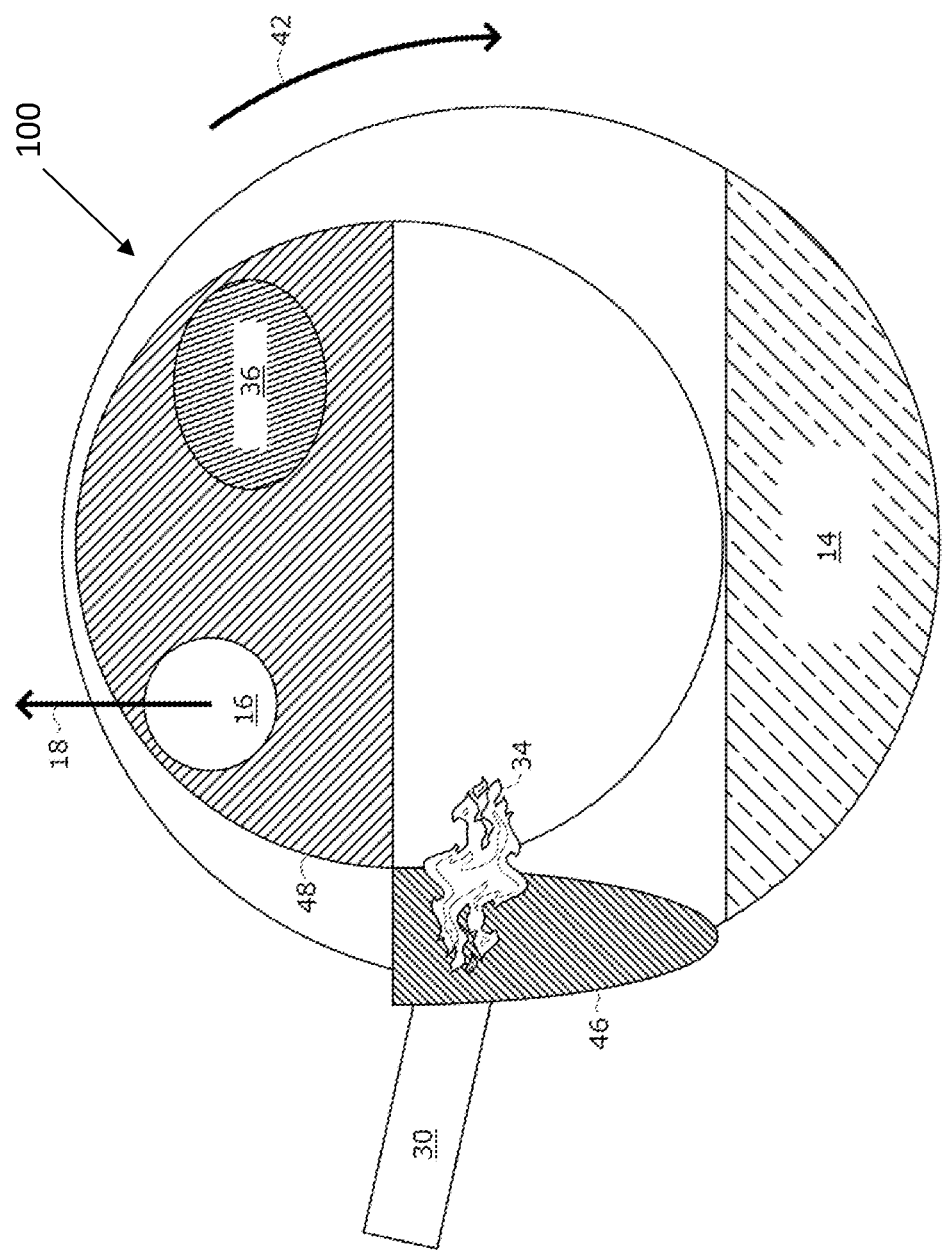
FIG. 7 is an end schematic view from the door end of the furnace showing another exemplary configuration of two burners in conjunction with a split-door in a multi-burner melting operation.

A variation of the embodiment of FIG. 6 is shown in FIG. 7, where the furnace door 44 is split, with the main burner 30 being located in a lower portion of the door 46 and the auxiliary burner 32 being located in an upper portion of the door 48, wherein the lower portion of the door 46 can open independently while the upper portion of the door 48 remains closed. This would enable energy and positive pressure to be maintained in the furnace during charging or sample of the melt, by continuing to fire the auxiliary burner 32 with the lower portion of the door open. This also helps to combat entrainment of tramp air when the door is open.

Figure 8A:
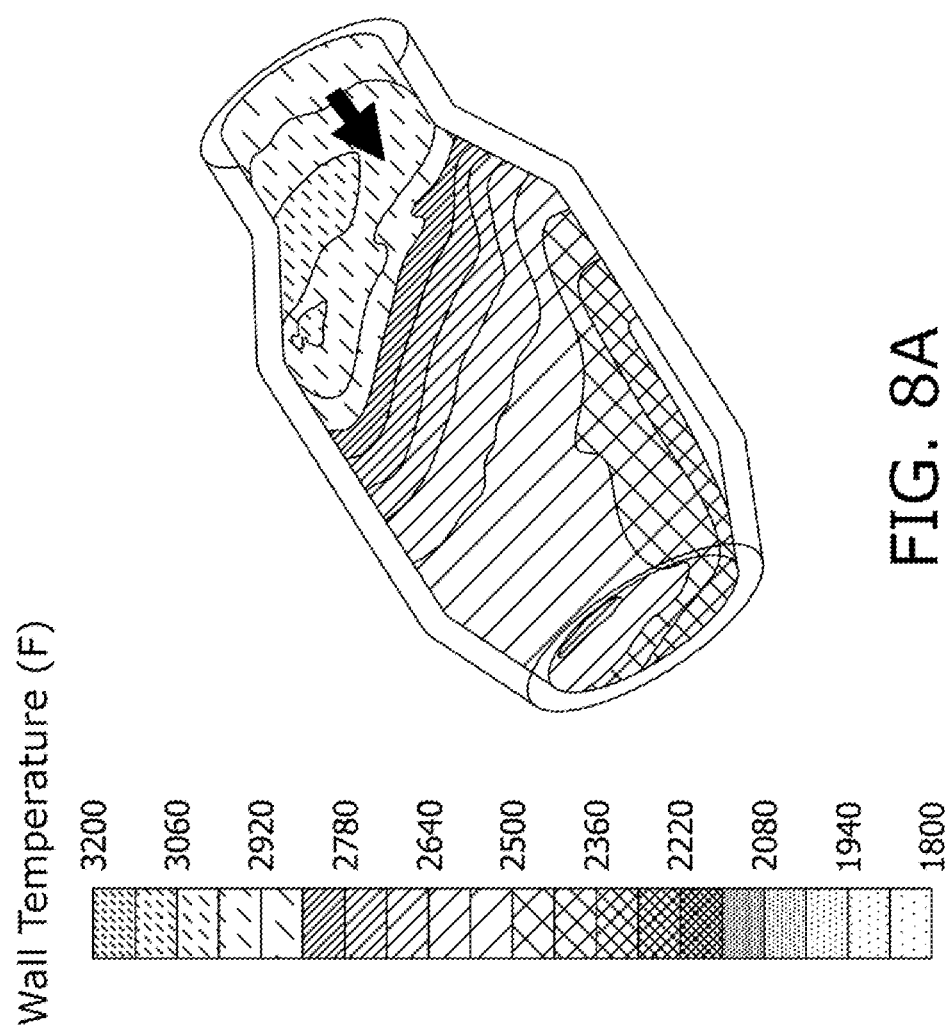
Figure 9:
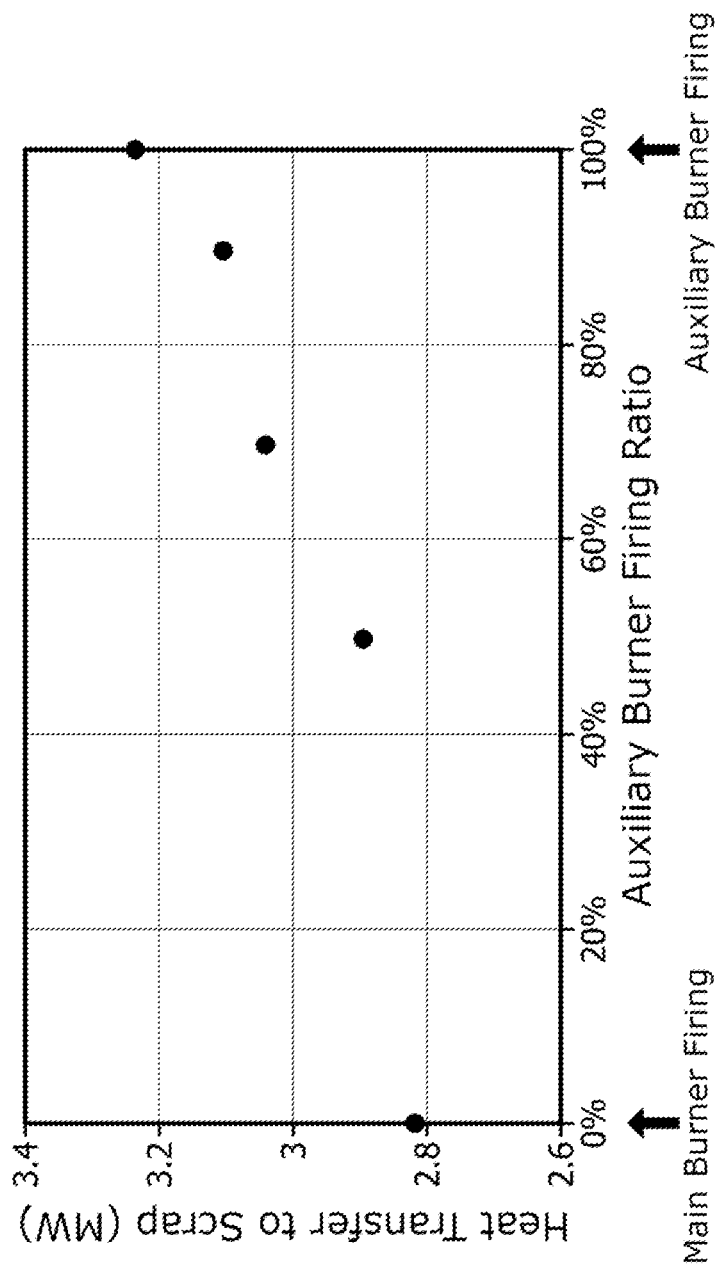

FIGS. 8A, 8B, and 9 show the results of a computational fluid dynamics study that simulated the arrangement in a titled rotary furnace. FIG. 8A shows the temperature distribution of the wall when the main burner 30 is firing individually in the furnace at the start of melt process. FIG. 8B shows the temperature distribution of the wall when the auxiliary burner 32 is firing individually at the start of the melt process. Since there is solid charge present at the beginning of the process, the main burner 30 has difficulty in transferring heat to the back and it ends up overheating the front wall of the furnace. On the contrary, the auxiliary burner 32 has a clear path for the flame thus reaching the back of the furnace to transfer the heat effectively to the charge. Thus operating the auxiliary burner 32 at the beginning and the main burner 30 towards the end of the process, can achieve optimum heat transfer from the burners to the process. FIG. 9 shows this in the form of calculated numbers from the simulation. The heat transfer from the burners to the melt increases as the ratio of auxiliary to main burner firing rate is increased. The simulations show that segregating the firing rate at two different locations and modulating it with time provides optimum heat transfer to the melt.

Figure 10:
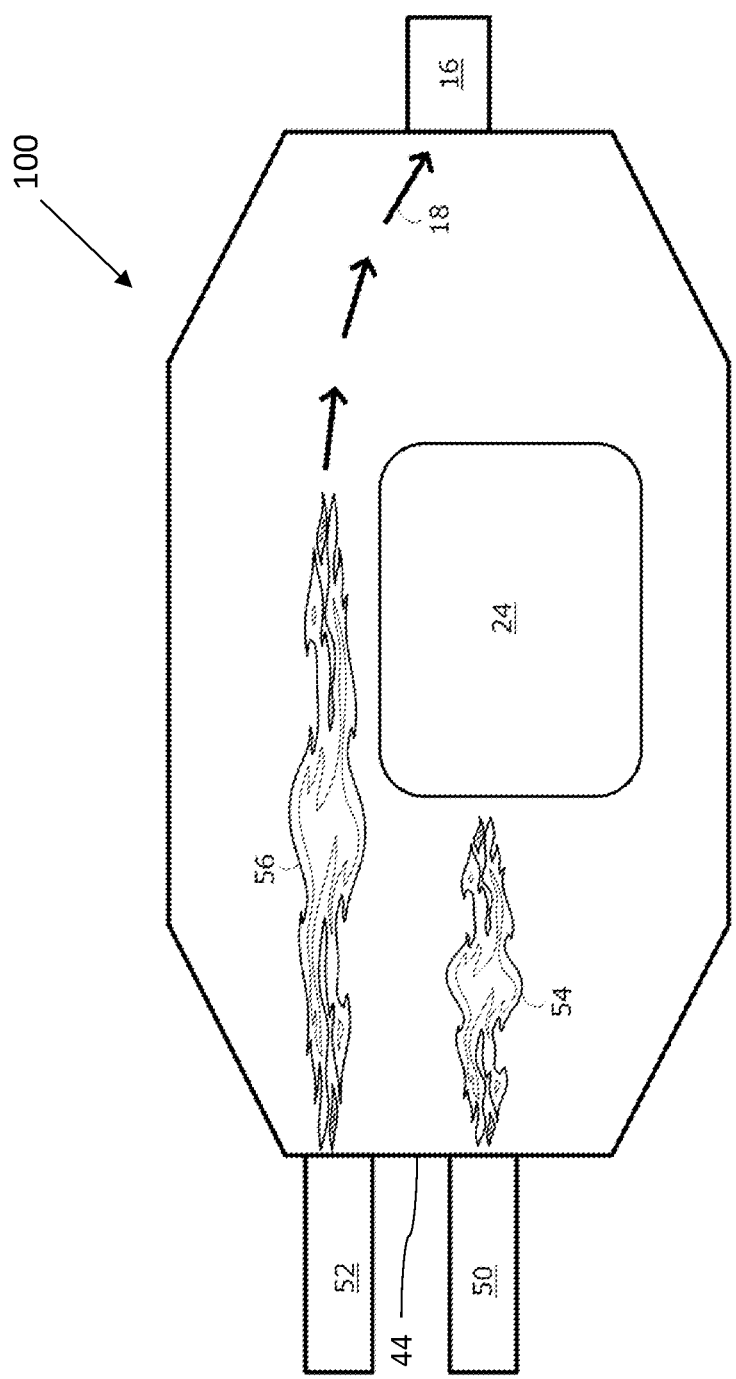
FIG. 10 is a top cutaway view showing a first embodiment using a multi-burner system in a straight axis single pass rotary furnace with both burners in the end of the furnace opposite the flue.
Figure 11:
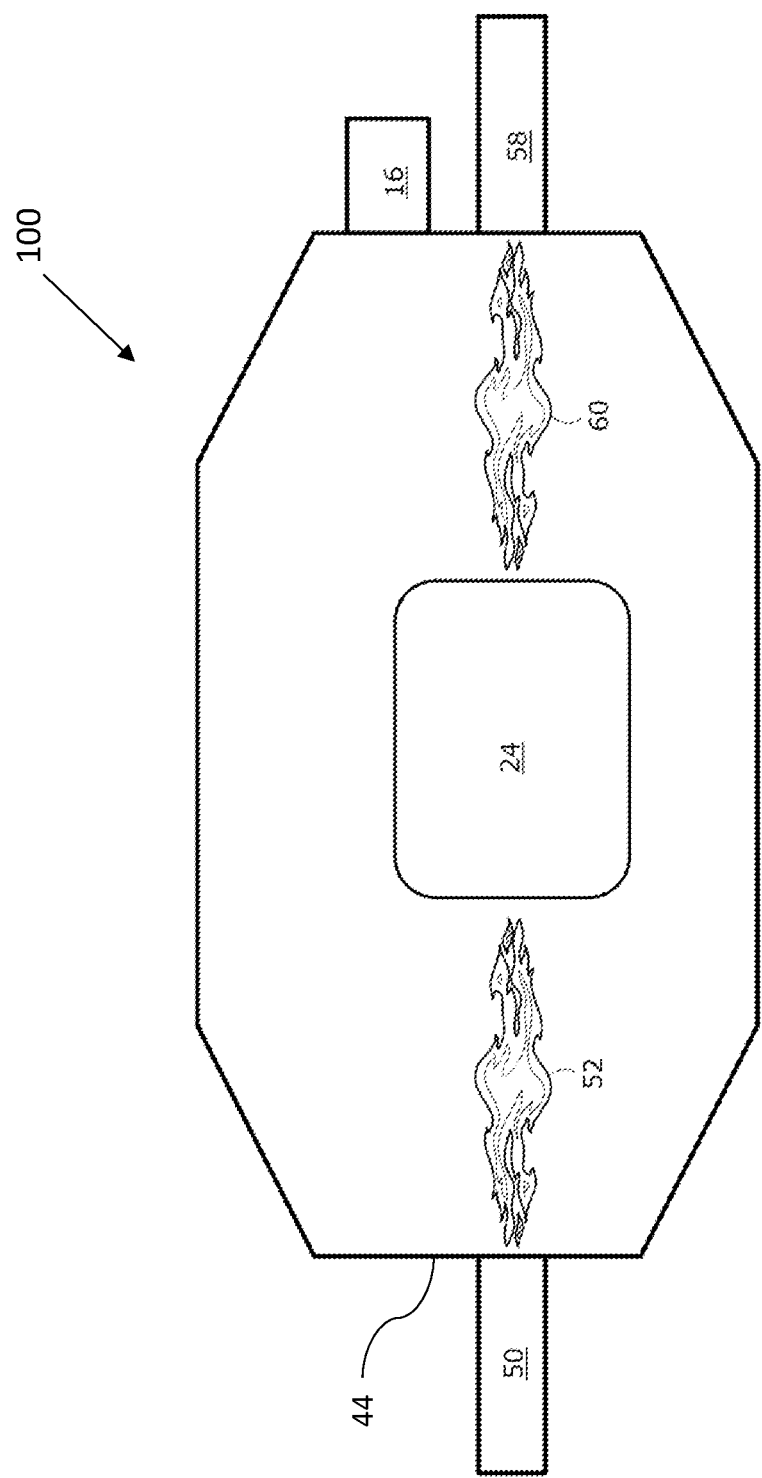
FIG. 11 is a top cutaway view showing a second embodiment using a multi-burner system in a straight axis single pass rotary furnace with one burner in the end of the furnace opposite the flue and another burner in the same end of the furnace as the flue.
Figure 12:
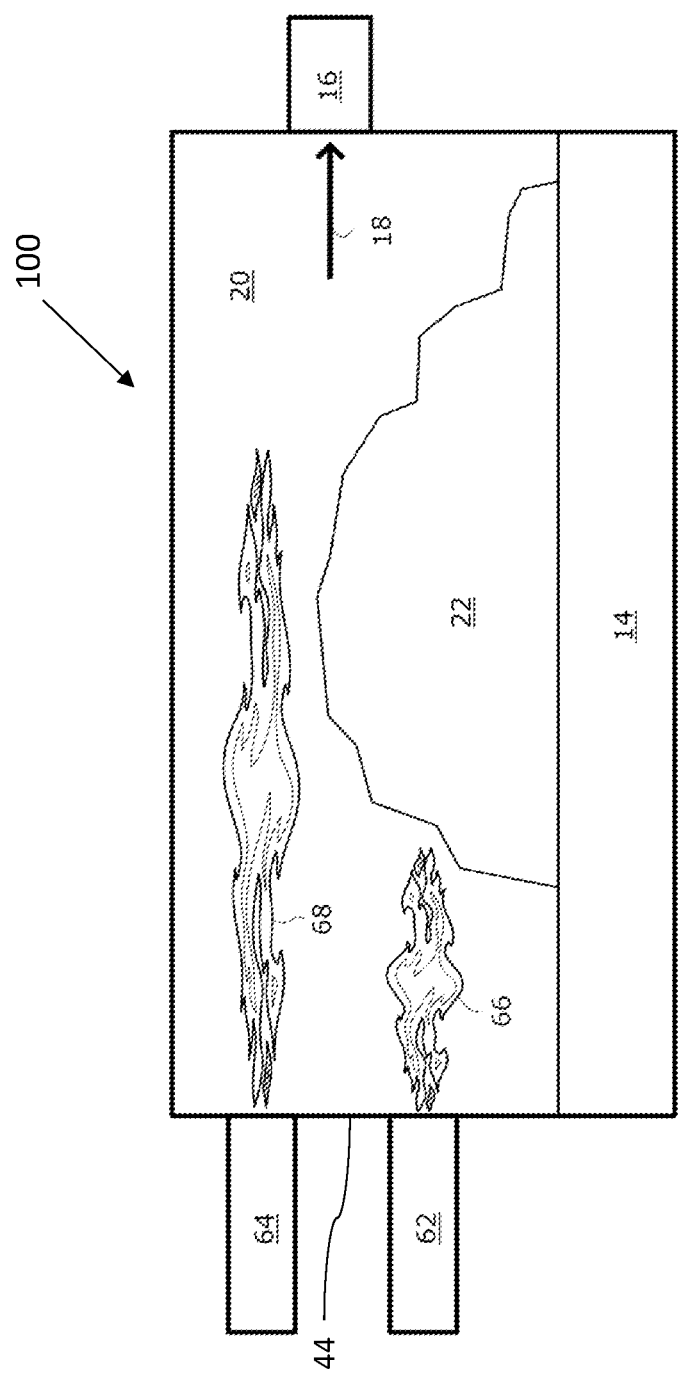
FIG. 12 is a side cutaway view showing a third embodiment using a multi-burner system in a straight axis single pass reverberatory furnace.

FIGS. 10 and 11 show alternative embodiments of the multi-burner system applied to a single pass rotary furnace. The multi-burner system flow path is outlined in both figures. In both these embodiments the flue duct 16 is on the opposite wall as that of at least one of the burners of the multi-burner system. When there is a charge 24 in front of the burners with both the main burner 50 and the auxiliary burner 52 on the same wall (FIG. 10), the main burner 50 will produce a short flame 54 capable of combusting in short distance, while the auxiliary burner 52 which has longer combustion space available will produce a longer flame 56, providing heat to the back of the furnace. When the burners are on opposite walls with the flue duct 16 being on one of the walls (FIG. 11), both the main burner 50 and the auxiliary burner 58 will produce short flames 52 and 60 respectively so as to melt the charge 24 from both sides. FIG. 12 shows a similar multi-burner system applied to a single-pass reverberatory furnace, in which main burner 62 produces short flame 66 near combustion space with low material porosity 22 and auxiliary burner 64 produces longer flame 68 that is able to pass through the combustion space with high material porosity 20.

The present invention is not to be limited in scope by the specific aspects or embodiments disclosed in the examples which are intended as illustrations of a few aspects of the invention and any embodiments that are functionally equivalent are within the scope of this invention. Various modifications of the invention in addition to those shown and described herein will become apparent to those skilled in the art and are intended to fall within the scope of the appended claims.

The invention claimed is:

1. A method of melting a charge in a double-pass tilt rotary furnace, the furnace having a chamber bounded by a generally cylindrical wall with an axis extending from a closed end to an open end, and a door configured to cover the open end, the method comprising:
   adding a charge containing solids into the chamber;
   rotating the furnace in a direction of rotation about the axis;
   operating a first burner at a first firing rate, the first burner being mounted in a lower portion of the door and producing a first flame having a length;
   operating a second burner at a second firing rate, the second burner being mounted in an upper portion of the door above the lower portion of the door and producing a second flame having a length, the second flame being distal from the charge relative to the first flame;
   exhausting combustion gases resulting from the first flame and the second flame through a flue positioned in the door above the charge;
   in an initial phase when the solids in the charge impede development of the first flame, controlling the second firing rate to be greater than the first firing rate; and
   in a later phase after melting of the solids in the charge sufficiently that development of the first flame is not impeded, controlling the first firing rate to be greater than the second firing rate;
   wherein as a result of the direction of rotation a submerging interface is formed wherein the cylindrical wall rotates into the charge and an emerging interface is formed wherein the cylindrical wall rotates out from the charge; and wherein the first burner and the second burner are positioned closer to the submerging interface than the emerging interface, and wherein the flue is positioned closer to the emerging interface than the submerging interface.

2. The method of claim 1, further comprising:
   during the initial phase, operating the first burner and the second burner such that the first flame length is less than the second flame length.

3. The method of claim 2, wherein at least one of fuel and oxidizer are staged in the first burner, and the first flame length is controlled by adjusting a staging ratio of the first burner.

4. The method of claim 2, wherein at least one of fuel and oxidizer are staged in the second burner, and the second flame length is controlled by adjusting a staging ratio of the second burner.

5. The method of claim 1, further comprising operating the second burner to produce a flame having high momentum with a velocity of at least 250 ft/s.

6. The method of claim 1, further comprising:
   operating the first burner fuel-rich to produce a reducing first flame; and
   operating the second burner stoichiometrically.

7. A multi-burner system for melting charge in a double-pass rotary furnace having chamber bounded by a generally cylindrical wall, an axis extending from a closed end to an open end, a door configured to cover the open end, and a direction of rotation, the chamber containing a charge, comprising:
- a first burner mounted in a lower portion of the door and positioned to direct a first flame having a length into the chamber;
- a second burner mounted in an upper portion of the door and positioned to direct a second flame having a length into the chamber distal from the charge relative to the first flame;
- a flue positioned in the upper portion of the door to exhaust from the chamber combustion gases resulting from the first flame and the second flame; and
- a submerging interface formed wherein the cylindrical wall rotates into the charge and an emerging interface is formed wherein the cylindrical wall rotates out from the charge, wherein the first burner and the second burner are positioned closer to the submerging interface than the emerging interface; and
- wherein the flue is positioned closer to the emerging interface than the submerging interface.

8. The system of claim 7, wherein at least one of fuel and oxidizer are staged in the first burner, and the first flame length is controlled by adjusting a staging ratio of the first burner.

9. The system of claim 7, wherein at least one of fuel and oxidizer are staged in the second burner, and the second flame length is controlled by adjusting a staging ratio of the second burner.

10. The system of claim 7, wherein the furnace door is split such that the lower portion and upper portion can be opened independently.

* * * * *